UNITED STATES PATENT OFFICE.

HORACE EDWARD ALCOCK, OF LUTON, ENGLAND, ASSIGNOR TO B. LAPORTE LIMITED, OF LUTON, ENGLAND.

MANUFACTURE OF PHOSPHORIC ACID.

No Drawing. Application filed May 5, 1924. Serial No. 711,234.

*To all whom it may concern:*

Be it known that I, HORACE EDWARD ALCOCK, a subject of the King of Great Britain, residing in Luton, England, have invented a certain new and useful Improved Manufacture of Phosphoric Acid, of which the following is a specification.

There are certain difficulties in the manufacture of pure phosphoric acid from mineral and like phosphates and the best product has generally been made from phosphorus pentoxide obtained from phosphorus.

By this invention substantially pure phosphoric acid is made from dibasic sodium phosphate which can readily be obtained in a substantially pure condition from mineral phosphates or other phosphates by known processes.

In one form of the invention the dibasic sodium phosphate is converted into the tribasic sodium phosphate and treated with barium sulphide, whereby barium phosphate and sodium sulphide are produced. The barium phosphate, having been suitably separated from the sodium sulphide, is decomposed with an acid, such as sulphuric acid, that liberates phosphoric acid and leaves an undissolved barium salt.

For example, barium sulphate, for instance in the form of barytes, is mixed with coal and heated in a furnace in known manner to produce a black ash which may contain 60-75 per cent of barium sulphide. This black ash is lixiviated and the barium sulphide liquor is mixed with caustic soda and dibasic sodium phosphate so as to produce the reaction—

$$3BaS + 2NaOH + 2Na_2HPO_4 = Ba_3(PO_4)_2 + 3Na_2S + 2H_2O.$$

The mixture is filtered, the filtrate being worked up if desired to obtain sodium sulphide as a by-product. The barium phosphate is washed and decomposed with sulphuric acid used in such proportion that as much phosphoric acid is liberated as is compatible with the absence of free sulphuric acid in the product. The barium sulphate is filtered and may be returned to the process or otherwise used.

In another form of the invention disodium phosphate may be treated directly with barium sulphide; the precipitate in this case also is barium phosphate, which may be supposed to be formed in accordance with the equation—

$$3BaS + 2Na_2HPO_4 = Ba_3(PO_4)_2 + Na_2S + 2NaHS.$$

The barium phosphate is made to yield phosphoric acid as already described.

The manufacture may also start from tribasic sodium phosphate made in any known manner, such as by adding sodium carbonate and caustic soda to an impure commercial phosphoric acid. In this case the barium sulphide and tribasic sodium phosphate are mixed to produce the reaction—

$$3BaS + 2Na_3PO_4 = Ba_3(PO_4)_2 + 3Na_2S.$$

The rest of the process is as already described.

Ammonium or potassium salts may be substituted for the sodium salts herein named.

The following examples illustrate the invention, the parts being by weight:—

(1) To 1155 parts of a solution of barium sulphide at 80° C. prepared in known manner and of specific gravity 1220, is added whilst stirring 293 parts of crystallized dibasic phosphate of soda and 109 parts of a solution of caustic soda of 30 per cent strength, until no further precipitation occurs. After filtering the precipitate and washing it until free from sulphide, it is stirred into the dilute phosphoric acid washings from a previous batch and decomposed with 130 parts of sulphuric acid of 92 per cent strength. The barium sulphate thus formed is filtered and washed and the filtrate and washings constituting the phosphoric acid are concentrated, if necessary, to desired strength.

(2) 495 parts of a solution of commercial phosphoric acid containing 80 parts of the acid calculated as $H_3PO_4$ are mixed at 70° C. with 87 parts of anhydrous sodium carbonate and 109 parts of a solution of caustic soda of 30 per cent strength. The mixture, after filtration if necessary, is mixed with 1155 parts of a solution of barium sulphide as prescribed in Example 1. The barium phosphate precipitate is worked up to phosphoric acid as described in Example 1.

Having thus fully described the nature of effect, I claim:—

1. A process for the manufacture of phosphoric acid which consists in causing a phosphate in aqueous solution and barium sulphide to react, collecting the precipitate thus produced and decomposing this precipitate with sulphuric acid.

2. A process for the manufacture of phosphoric acid which consists in causing a soluble phosphate of a metal which does not form an insoluble sulphide to react with barium sulphide, separating the barium phosphate and metal sulphide thus produced and decomposing the barium phosphate with sulphuric acid.

3. A process for the manufacture of phosphoric acid which consists in decomposing commercially pure dibasic sodium phosphate with caustic soda and barium sulphide and decomposing the barium phosphate thus produced by means of sulphuric acid in such proportion that free sulphuric acid is absent from the phosphoric acid produced.

4. [A process ... causing barium] sulphide to react with the phosphate of a metal which forms a soluble sulphide.

5. A process for the manufacture of pure phosphoric acid which consists in converting commercial impure phosphoric acid into a soluble phosphate of a metal which does not form an insoluble sulphide, causing this phosphate to react with barium sulphide and decomposing by means of sulphuric acid the barium phosphate thus produced.

6. A process of purifying phosphoric acid which consists in mixing a solution of the phosphoric acid with caustic soda and sodium carbonate, causing the solution of sodium phosphate thus obtained to react with barium sulphide and decomposing the barium phosphate thus produced by means of sulphuric acid in proportion less than that chemically equivalent to the barium phosphate.

In testimony whereof I have signed my name to this specification.

HORACE EDWARD ALCOCK.